United States Patent [19]

Whitmore

[11] 3,761,033

[45] Sept. 25, 1973

[54] HUBS

[75] Inventor: Derek Whitmore, Kidsgrove, England

[73] Assignee: International Computers Limited, London, England

[22] Filed: Apr. 20, 1971

[21] Appl. No.: 135,673

[30] Foreign Application Priority Data

June 16, 1970 Great Britain .................. 29,068/70

[52] U.S. Cl. .................................................. 242/74

[51] Int. Cl. .............................................. B65h 75/28

[58] Field of Search .................... 242/68.3, 74, 68.4, 242/68.5, 77.4, 71.8, 71.8 A, 115, 116, 118.4, 118.6, 118.61

[56] References Cited

UNITED STATES PATENTS

| | | | |
|---|---|---|---|
| 2,852,204 | 9/1958 | Hoecker | 242/118.4 X |
| 3,326,491 | 6/1967 | Bradt | 242/74 |
| 3,127,122 | 3/1964 | Roshkind | 242/74 X |
| 1,629,154 | 5/1927 | Ybarrondo | 242/74 X |

*Primary Examiner*—George F. Mautz
*Assistant Examiner*—Edward J. McCarthy
*Attorney*—Misegades & Douglas, Keith Misegades and George R. Douglas, Jr.

[57] ABSTRACT

A vacuum hub for tape reels and capstans is disclosed. The hub consists of two hollow parts each part having a ring of spaced projections thereon. The width of the projections being less than the width of the spaces between the projections. When the two parts are secured together with the projections of one part inserted into the spaces of the other part a series of spaced apertures is formed extending from the interior of the hub to the outer surface.

6 Claims, 2 Drawing Figures

HUBS

BACKGROUND OF THE INVENTION

The present invention relates to hubs particularly suitable for tape spools and reels for use in recording and reproducing apparatus, for example, in which differential air pressure is used to locate a tape.

Web handling apparatus is known in which the motion of continuous webs, for example, paper or magnetic tape, is controlled by capstans to which a vacuum is applied and the leading edge of the tape is wound on to a spool or reel having a hub to which vacuum is applied. The hubs of the capstan or reels are generally one-piece devices in which slots or holes are formed in the body of the hubs and these devices require time-consuming, complex and costly machining operations.

SUMMARY OF THE INVENTION

According to the present invention, a hub includes two hub members each having a cylindrical outer surface of the same diameter and a mating edge extending around an inner face of each hub member adjacent the outer surface; said hub members being secured together with the mating edges juxtaposed, said mating edges being so formed that the edges are out of contact with one another at a series of spaced positions around the circumference of the hub to provide a series of spaced apertures extending from the hollow interior of the hub to the cylindrical outer surface to permit the application of vacuum to the outer surface.

BRIEF DESCRIPTION OF THE DRAWINGS

A tape reel embodying the present invention will now be described, by way of example, with reference to the accompanying drawing, in which.

DESCRIPTION OF THE PREFERRED EMBODIMENTS

Figures 1, 2:
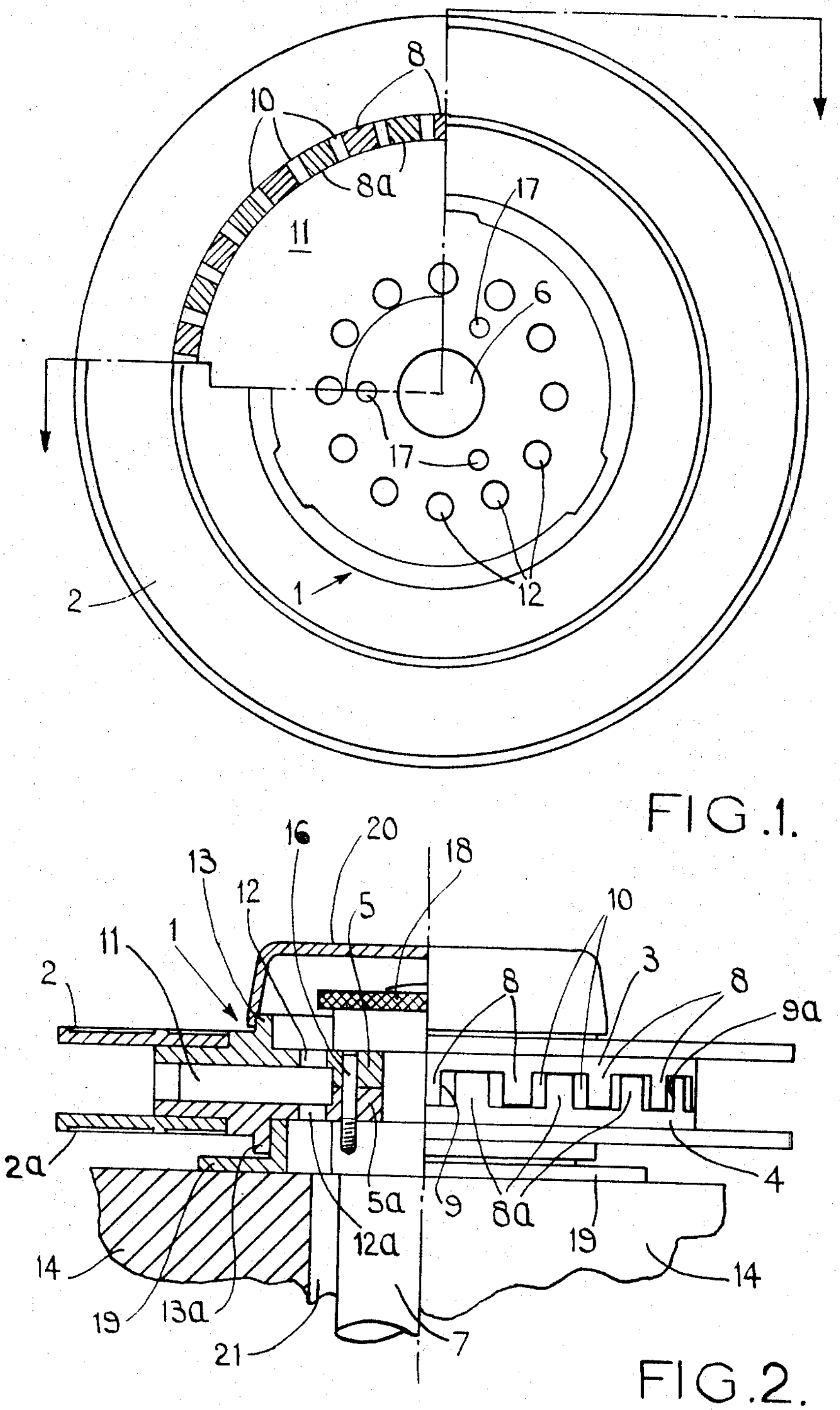
FIG. 1 is a general view, partly in section, of a tape reel.
FIG. 2 is a side view, partly in section, of the tape reel of FIG. 1 indicating diagrammatically the arrangement of the reel in an operative position on a tape handling apparatus.

Referring now to the drawing, the hub 1 forms the center of a tape reel which has side cheeks 2. The hub 1 is formed of two identical members 3, 4 only one of which (3) will be described in detail, the reference numerals of the corresponding parts of member 4 being indicated by the suffix *a*.

The member 3 has an annular side wall with a boss 5 on one face thereof, a central hole 6 extending through the boss 5 and the side wall. A plurality of projections 8 are uniformly spaced round the perimeter of the member 3. The projections 8 all extend from the same face of the member 3 as the boss 5 and are narrower than the spaces 9 between the projections. The projections 8 and the spaces 9 therebetween form a sinuous edge for subsequent mating with a similar edge on the member 4.

The member 3, 4 are secured together so that the bosses, **5, 5*a* abut one another in a substantially airtight relationship and the mating edges are brought together so that the projections 8 project into the spaces 9*a* on the member 4. Since the projections 8 are narrower than the projections 8*a* gaps are formed between each projection 8 and the adjacent projections 8*a* on either side to provide discrete slots 10 in the outer cylindrical surface of the hub 1. The bosses 5, 5*a* are dimensioned so that a chamber 11 is formed between the members 3, 4. The slots 10 provide communication through the outer cylindrical surface between the chamber 11 and the exterior of the hub 1. A plurality of holes 12 and a similar plurality of holes 12*a* are formed through the members 3, 4 respectively providing communication through the side walls between the chamber 1 and the exterior of the hub 1. The members 3, 4 have annular rings 13, 13*a* respectively, projecting from their outer faces radially exterior of each plurality of holes 12, 12*a*. Side cheeks 2, 2*a* are secured to each of the members respectively of hub 1**.

In use the tape reel is placed on the take-up mechanism of an apparatus which has a base plate 14 through which a drive shaft 7 projects. The central hole of the tape reel, extending through the bosses **5, 5*a*, receives the end portion of the shaft 7 and the reel is located on the shaft by three pegs 16 projecting from a shoulder on the shaft and engaging in corresponding holes 17 extending through the bosses 5, 5*a* of the tape reel. The end of the shaft (not shown) is threaded and the reel is secured on the shaft 7 by a threaded knurled nut 18. An annular sealing flange 19 is mounted on the base plate 14 concentrically with the shaft 7 and extending inside the annular ring 13*a* of the tape reel. The outer diameter of the flange 19 is such that the tape reel may rotate freely but the flange 19 and the annular ring 13*a* provide a sufficient restriction to air flow therebetween so as to effectively seal the space around the shaft 7 between the reel and the base plate 14. A sealing cover 20 is clipped over the annular ring 13. A duct 21 surrounds the shaft 7 in the apparatus and a connection is provided for the duct 21** to a source of low pressure air, or vacuum (not shown).

In operation, the drive shaft 7 is rotated and the vacuum source draws air from outside the hub 1 through the slots 10, the chamber 11, the holes **12*a* and the duct 21. When an end of a tape (not shown) is inserted between the side cheeks 2, 2*a* it is drawn towards the slots 10 in the periphery of the hub 1 and initially is held to the hub 1 by differential air pressure and subsequently is held by overlying layers of tape as the hub 1** is rotated.

The members 3, 4 forming the hub 1 each have an annular ring (**13, 13*a* respectively) on an external face so that the reel may be placed on the tape handling apparatus either as shown in FIG. 2 with ring 13*a* co-operating with the flange 19 and the cover 20 clipped on to ring 13, or the other way round with ring 13 co-operating with flange 19 and the cover 20 clipped on to ring 13*a*. If the reel is intended to be placed on the apparatus only one way round the two members 3, 4 need not be identical and the holes 12 on the member 3 may be omitted, in which case the sealing cover 20** is not required.

Any suitable material may be used for the manufacture of the reel including thermoplastic and thermosetting plastics materials or the reel may be made of metals, particularly light alloys. It has been found that 30 percent glass-filled acrylonitrile resin is a suitable material for the hub 1 while 75 percent styrene: 25 percent acrylonitrile resin has been found to be suitable for the side cheeks 2.

When plastics materials are employed, ultrasonic welding may be used to secure the components of the tape spool together. Alternatively, the contacting surfaces may be secured together with a suitable adhesive, the surfaces being roughened if necessary.

The side cheeks 2, 2*a* may be made of different materials one from the other or one may be provided with a different finish on the external surface in order to provide an indication to aid in orientating the reel on the tape handling apparatus.

Whereas the slots 10 are shown as being formed between the sides of adjacent projections 8, 8*a* it will be realized that differently shaped apertures communicating with the chamber 11 may be formed. For example, if the projections 8, 8*a* on the hub members 3, 4 respectively are rotationally displaced relative to one another as compared with the construction shown in the drawing the slots may be of unequal size or the number of slots may be halved. Furthermore, with the projections 8 positioned centrally between the projections 8*a* a continuous slot of sinuous form is produced if the projections 8, 8*a* are insufficiently long to engage the other hub member, or if the projections 8 are slightly shorter than the projections 8*a* adjacent pairs of slots will be joined. However, if the projections 8, 8*a* are displaced as described above and the projections 8 are shorter than the projections 8*a*, L -shaped apertures will be produced. Instead of the castellated mating edges illustrated in the drawing, the hub members may have generally sinuous mating edges. It will also be apparent that the two hub members need not have identical mating surfaces. The only requirement is that when the two edges are juxtaposed they are out of contact with one another at a series of positions around the circumference of the hub.

To assist with the alignment of the various components of the tape reel, dowel holes and pins may be provided in suitable locations.

The side cheeks may be formed integrally with the members 3, 4 forming the hub 1, if desired, and the side cheeks may be apertured in order to reduce the weight of the tape reel.

The form of construction used for the hub of the tape reel may also be used in the construction of a capstan roller, such as is used in magnetic tape apparatus, the side cheeks being omitted. The hub for a capstan would be of relatively small diameter as compared with its length and the apertures in the hub will be formed by interleaving or intermeshing projections formed on each of two members secured together to form the hub.

It will be appreciated that the apertures in the hub may be connected to the source of low pressure air in other ways and with some constructions of drive shaft and connection for the supply of low pressure air the hub may consist of two hollow cylinders of the same diameter mounted on a shaft. The hollow cylinders are secured together end to end the abutting ends having projections, the projections being interleaved to form the peripheral apertures. In this case the shaft on which the hub is to be mounted may have a part of its surface, lying within the hub, reduced in diameter, this reduced part communicating with a channel which is connected to the source of low pressure air. In order to minimize leakage of air through the bore of the hub, the shaft may also incorporate sealing rings such as, for example, conventional O rings supported in grooves on the shaft.

The hub may be keyed to the drive shaft or the hub may include a spring-loaded retainer (such as a spring loaded ball) engageable with the shaft to provide a non-slip drive or positive positioning of the hub on the shaft.

If the tape-like material itself has apertures as, for example, punched paper tape, the apertures in the hub may be positioned such that they may be contacted only by the imperforate areas such as the marginal edges of the tape. In this case the slots may be formed by making the projections 8, 8*a* of the same width as the width of the spaces therebetween but sufficiently short so that, with spacing of the hub members by the bosses 5, 5*a* two rows of slots are formed between the tips of the projections and the bases of the spaces.

I claim:

1. A hollow hub assembly including first and second hollow hub members each having: a wall with a cylindrical external surface and an end surface extending inwardly from the associated cylindrical surface; and means defining a plurality of spaced apart projections extending axially from said end surface to produce a plurality of spaced apart slots; the assembly also including means maintaining the first and second hub members in fixed cooperation with each other such that the end surfaces face towards each other with said projections cooperating to produce a plurality of spaced apart apertures extending from the cylindrical external surfaces to the hollow interior of the assembly and means for applying a vacuum to the interior of the hollow hub assembly to produce by way of the apertures a suction effect at said cooperating cylindrical external surfaces.

2. A hollow hub assembly as claimed in claim 1 in which the end surface of the wall of each of the two hub members are of castellated profile and in which the width of the projections of one hub member is less than the width of the slots between the projections of the other hub member.

3. A hollow hub assembly as claimed in claim 1 in which the two hub members are so positioned relative to one another to produce the spaced apertures at both sides of each projection.

4. A hollow hub assembly as claimed in claim 1 in which the projections on each of the two hub members are of identical form.

5. A reel including a hollow hub assembly as claimed in claim 1 and including first and second side cheeks on the first and second hub members respectively.

6. A hollow hub assembly as claimed in claim 1 in which each hollow hub member includes an annular side wall and an inner circumferential wall projecting from the inner face of the hub member adjacent the inner edge of the annular side wall and spaced from the end surface, the inner walls of the two hub members respectively abutting one another in substantially air-tight relation; the side wall of at least one hub member having a plurality of holes intermediate the end surface and the inner wall thereof and a first annular flange on the outer face of that hub member radially exterior of the plurality of holes for co-operating with a removable second annular flange concentric with a shaft on which the hub may be mounted to provide a passage from a vacuum source through said plurality of holes to the hollow interior of the hub.

* * * * *